(12) United States Patent
Chaney

(10) Patent No.: US 6,947,724 B2
(45) Date of Patent: Sep. 20, 2005

(54) SYSTEM AND METHOD OF BILLING BASED ON THE REPORTED TRAFFIC LOAD IN A TELECOMMUNICATIONS NETWORK

(75) Inventor: Adam Chaney, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 652 days.

(21) Appl. No.: 10/038,934

(22) Filed: Jan. 4, 2002

(65) Prior Publication Data

US 2003/0129962 A1 Jul. 10, 2003

(51) Int. Cl.[7] .............................................. H04M 11/00
(52) U.S. Cl. .................... 455/408; 455/406; 455/435.1; 455/414.1; 379/114.01; 379/114.03; 379/112.08
(58) Field of Search ................................ 455/406, 408, 455/414.1, 405; 379/111, 114.01, 112.08, 112.06, 114.03, 220.01

(56) References Cited

U.S. PATENT DOCUMENTS

| | | |
|---|---|---|
| 5,970,403 A | 10/1999 | Alperovich et al. |
| 5,991,378 A | 11/1999 | Apel |
| 6,006,085 A | 12/1999 | Balachandran |
| 6,111,946 A * | 8/2000 | O'Brien ........................ 379/230 |
| 6,356,627 B1 * | 3/2002 | Hayball et al. ......... 379/112.01 |
| 6,498,838 B1 * | 12/2002 | Schoenborn ................. 379/111 |
| 6,721,405 B1 * | 4/2004 | Nolting et al. .............. 379/133 |
| 2003/0108000 A1 * | 6/2003 | Chaney et al. .............. 370/260 |

FOREIGN PATENT DOCUMENTS

| | | |
|---|---|---|
| EP | 1 161 104 A | 12/2001 |
| WO | WO 97 57503 A | 10/1997 |
| WO | WO 01 91446 A | 11/2001 |

* cited by examiner

Primary Examiner—William Trost
Assistant Examiner—Danh C Le

(57) ABSTRACT

A system and method in a telecommunications network for billing a call placed by a user based on a reported traffic load in the network. The system includes at least one Media Gateway Control Function (MGCF) that sends a reported traffic load for the MGCF in a registration message to a presence and instant messaging (PIM) Server. Users that subscribe to a load-based billing service also register with the PIM Server. The PIM server sends the reported traffic load to the users whenever the traffic load is updated by the MGCF, and to a billing node when the user places the call. A Call State Control Function (CSCF) sends the duration of the call to the billing node. The billing node determines a billing rate based on the reported traffic load and calculates a charge for the call based on the determined billing rate and the duration of the call.

14 Claims, 5 Drawing Sheets

SYSTEM AND METHOD OF BILLING BASED ON THE REPORTED TRAFFIC LOAD IN A TELECOMMUNICATIONS NETWORK

BACKGROUND OF THE INVENTION

1. Technical Field of the Invention

This invention relates to telecommunication systems. More particularly, and not by way of limitation, the invention is directed to a system and method of billing users of telecommunication services in a telecommunications network based on the reported traffic load in the network.

2. Description of Related Art

Wireless telecommunication networks are evolving from second generation (2G) circuit-switched networks to third generation (3G) packet-switched networks. A reference architecture for a 3G wireless network is being developed by the Third Generation Partnership Project (3GPP). The 3GPP network architecture uses the Session Initiation Protocol (SIP) developed by the Internet Engineering Task Force (IETF) for call setup signaling. Media is then transported through an existing IP network. The SIP standard is described in RFC 2543 which is hereby incorporated in its entirety by reference herein.

In a SIP network, users register their existence on a sub-network through a Call State Control Function (CSCF). Each user has a unique SIP ID which is an address which follows the user to different terminals. For example, when a user sits at his office desk, he can register himself as being at his desk. The desk phone sends a SIP REGISTER message with the user's unique SIP ID and the phone's hardware device ID to the CSCF so that it knows where to route the user's calls. The REGISTER message also contains a presence state that indicates the current status of the user. For example the user may designate that he is at his desk, but is currently not available.

The presence state in the REGISTER message is routed to a Presence and Instant Messaging (PIM) Server associated with the CSCF. The PIM server provides the user's presence state to other users on the network and also enables the user to monitor the presence state of other users. The user can determine the other party's presence state (for example, registered, not registered, busy, etc.) from a display such as a telephone or computer display at his desk before placing a call.

An originating user need not specify the exact destination address associated with the destination user. The 3GPP network uses aliases associated with particular users to automatically determine the identity of their registered terminals or devices, and to automatically format and deliver communications with the registered devices over an existing IP network. Thus, the 3GPP network architecture provides a centralized and independent communication control mechanism. For a registered user, the 3GPP network and associated elements keep track of the user's exact location and the identity of the user's registered terminal, and accordingly route and enable communication with that registered user over the existing IP network.

When billing the users for telephony services, providers have traditionally billed an amount equal to a billing rate (for example $0.10/minute) times the duration of the call. The billing rate has historically been adjusted during different periods of the day and week. For example, lower rates have typically been used for nights and weekends than the peak rate that is used during the workweek day. These adjustments in the billing rate have been made due to estimated changes in the traffic load on the network. Since the load is typically the heaviest during the workweek day, a higher rate is charged for calls during this period of time.

However, the traditional method of adjusting the billing rate relies on a gross estimate of the traffic load on the network based on historical averages of traffic loads at different times of the day. At any particular time, the actual traffic load may be lower or higher than the historical averages, and thus, the user may be charged at a rate that is either too high or too low for the actual network conditions. It would be advantageous, therefore, to have a system and method of billing users of telecommunication services in a telecommunications network based on the reported traffic load in the network at the time that the user places the call. The present invention provides such a system and method.

SUMMARY OF THE INVENTION

The present invention provides a system and method for a service node in a telecommunications network to generically register itself as having specified service types, and having certain capabilities associated with the types of services that it offers. A modified Presence and Instant Messaging (PIM) server then provides this service capability information to users who subscribe to the service. In particular, the present invention reports the network traffic load to the PIM Server, and the PIM Server, in turn, provides traffic load information to the users, thus enabling the users to assess the billing rate currently in effect prior to placing a call.

Thus, in one aspect, the present invention is directed to a method of billing a call made by a user in a telecommunications network based on a reported traffic load in the network. The method includes the steps of sending to a presence server in the network, a registration message from at least one Media Gateway Control Function (MGCF). The registration message is modified to include a traffic load for the MGCF. This is followed by determining a billing rate for the user based on the traffic load reported by the MGCF, and applying the determined billing rate to the call to calculate a charge for the call. The method may also include registering a user in the network who subscribes to a network-load based billing service, and sending from the presence server to the user, an indication of the traffic load reported by the MGCF.

In another aspect, the present invention is directed to a method of billing a call that includes the steps of sending from at least one MGCF to a presence server in the network, a registration message that includes a traffic load for the MGCF; and sending an update of the traffic load from the MGCF to the presence server whenever the traffic load of the MGCF changes by a threshold amount. The method also includes registering in the network, a user who subscribes to a network-load based billing service; and sending from the presence server to the user, an indication of the current traffic load reported by the MGCF. When the user places the call, the presence server sends the reported traffic load to a billing node. The billing node then determines a billing rate for the user based on the traffic load reported by the presence server. The method also includes determining by a Call State Control Function (CSCF), parameters of the call relating to network resource usage; and sending the parameters from the CSCF to the billing node. The billing node then calculates a charge for the call based on the determined billing rate and the parameters relating to network resource usage.

In yet another aspect, the present invention is directed to a system in a telecommunications network for billing a call placed by a user based on a reported traffic load in the network. The system includes at least one MGCF that sends registration information, including a reported traffic load for the MGCF, to the network. The system also includes a PIM server that receives the registration information from the MGCF and sends the reported traffic load to a billing node. A CSCF determines parameters of the call relating to network resource usage and sends the parameters to the billing node. The billing node determines a billing rate based on the reported traffic load and calculates a charge for the call based on the determined billing rate and the parameters relating to network resource usage.

In still yet another aspect, the present invention is directed to a system for billing a call based on a reported traffic load in the network. The system includes means for controlling data transferred through the network, the data controlling means including means for sending registration information and a reported traffic load to the network. The system also includes means for receiving the registration information from the data controlling means and sending the reported traffic load to a billing means. A means for setting up and controlling the call includes means for determining parameters of the call relating to network resource usage and sending the parameters to the billing means. Finally, the system includes billing means for determining a billing rate based on the reported traffic load and calculating a charge for the call based on the determined billing rate and the parameters relating to network resource usage.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
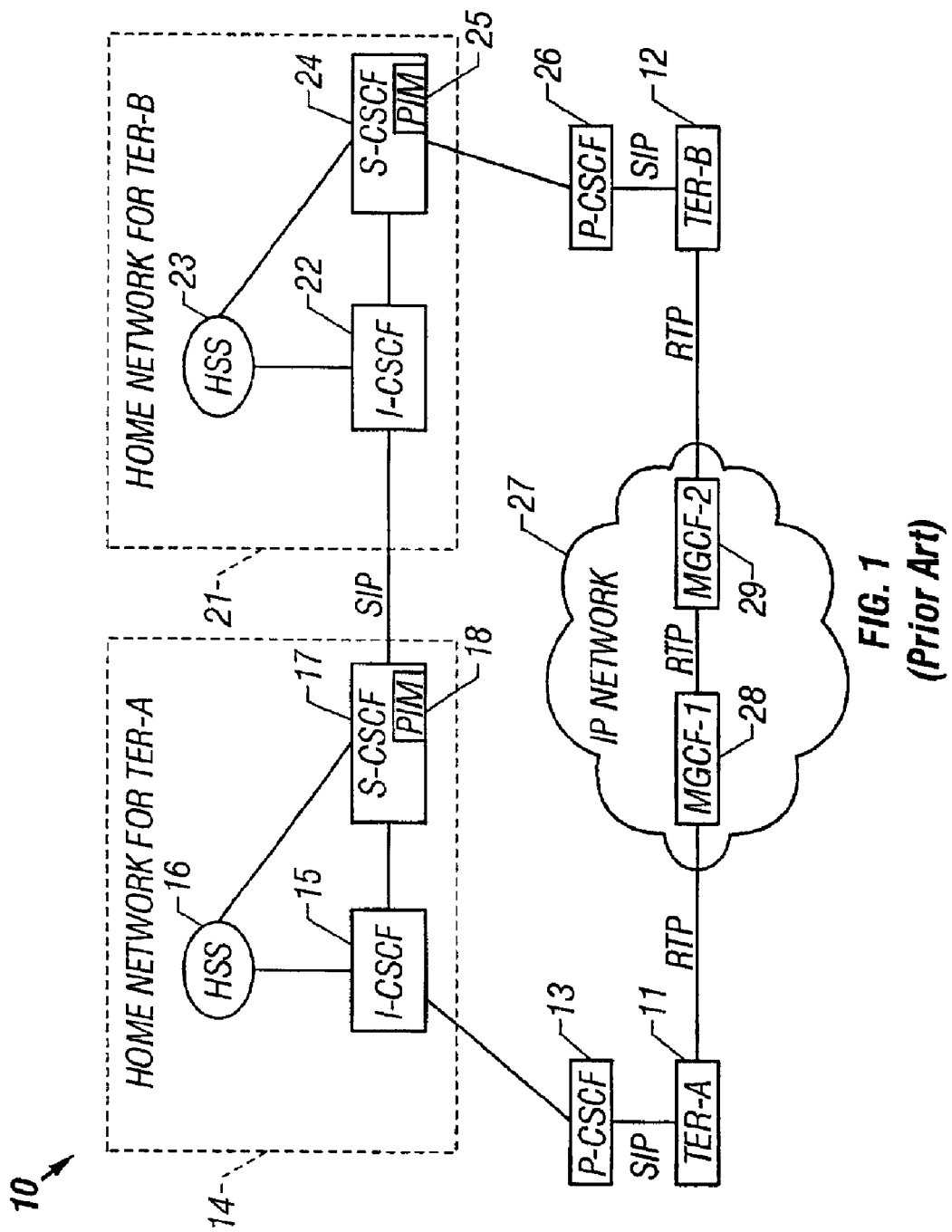
FIG. 1 (Prior Art) is a simplified block diagram of a portion of a typical 3GPP network architecture.

In the drawings, like or similar elements are designated with identical reference numerals throughout the several views thereof, and the various elements depicted are not necessarily drawn to scale. Referring now to FIG. 1, a block diagram of a portion of a typical 3GPP network architecture 10 is depicted. The portion illustrated is suitable for setting up a call between an originating user utilizing Terminal-A 11 and a terminating user utilizing Terminal-B 12. A principal node in the 3GPP architecture is the Call State Control Function (CSCF). Each of the parties has an associated CSCF. The CSCF is essentially a switch that provides the parties with access to the network and routes the call setup signaling between the parties. Each CSCF includes a Proxy CSCF (P-CSCF), an Interrogating CSCF (I-CSCF), and a Serving CSCF (S-CSCF).

The P-CSCF is the first point of contact for a user registering with the network. When Terminal-A 11 registers, the originating P-CSCF 13 determines the home network 14 associated with the originating user and performs authentication and verification with the specified home network. When Terminal-A originates a call, the originating I-CSCF 15 queries an originating Home Subscriber Server (HSS) 16 associated with Terminal-A for user information. The HSS is the master database for a given user and is the network entity containing the subscription-related information to support the network entities actually handling the call/session. The HSS is further used to determine and locate the originating user's S-CSCF 17. The originating S-CSCF provides service invocation and other user features available to the subscribed users. The originating S-CSCF also includes a Presence and Instant Messaging (PIM) server 18.

The terminating (called) user also has an associated home network 21. The terminating home network includes a terminating I-CSCF 22, a terminating HSS 23, and a terminating S-CSCF 24 having a PIM server 25. Terminal-B registers with the terminating home network through a terminating P-CSCF 26. Once call setup is complete, media is exchanged between the two parties via an existing IP network 27 using the Real Time Protocol (RTP). Within the IP network, a first Media Gateway Control Function (MGCF-1) 28 controls access into the IP network for Terminal-A, and MGCF-2 controls access into the IP network for Terminal-B.

Figure 2:
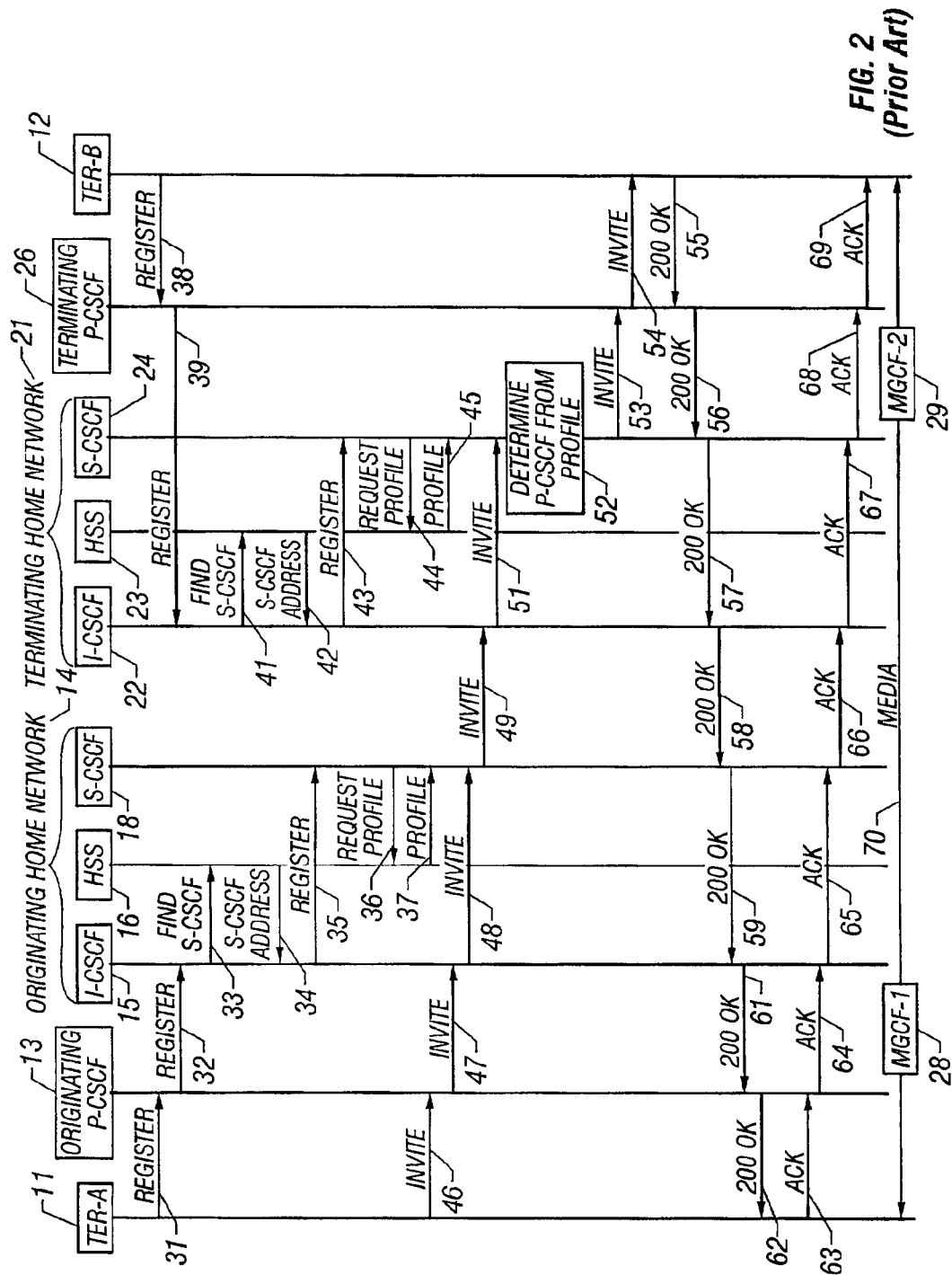
FIG. 2 (Prior Art) is a signaling diagram illustrating typical call setup signaling utilizing SIP signaling in the 3GPP network architecture of FIG. 1.

FIG. 2 is a signaling diagram illustrating typical call setup signaling utilizing SIP signaling in the 3GPP network architecture of FIG. 1. First, the two terminals register with the network. Terminal-A 11 sends a REGISTER message 31 to the originating P-CSCF 13. The originating P-CSCF uses the domain specified in the "From" field of the REGISTER message to determine the home network 14 associated with that particular user, and performs authentication and verification with the specified home network. The Domain Name Server (DNS) record for the home network points to the originating I-CSCF, and at step 32, the P-CSCF sends the REGISTER message to the originating I-CSCF 15. At step 33, the I-CSCF queries the originating HSS 16 associated with that particular originating subscriber for the address of the originating user's current S-CSCF 18. If this is an initial registration with the network, Terminal-A has no S-CSCF. In this case, the HSS returns selection criteria to the I-CSCF, and the I-CSCF selects a suitable S-CSCF for the user from a plurality of available S-CSCFs in the originating home network 14. If the registration is a re-registration, the HSS returns the address of the current originating S-CSCF to the originating I-CSCF, as shown in step 34, where the information is cached.

At step 35, the REGISTER message is forwarded to the originating S-CSCF 18. At 36, the originating S-CSCF queries the originating HSS for User-A's profile information to determine what telephony features the originating user has subscribed to or activated, such as call blocking, call forwarding, voice mail, and the like. At step 37, the HSS returns the profile information to the originating S-CSCF where the information is cached.

Likewise, Terminal-B 12 sends a REGISTER message 38 to the terminating P-CSCF 26. The terminating P-CSCF determines the home network 21 associated with that particular user from the REGISTER message and performs authentication and verification with the specified home network. At 39, the REGISTER message is forwarded to the terminating I-CSCF 22. The terminating I-CSCF queries the terminating HSS 23 at step 41 to identify and locate the terminating S-CSCF 24 where the destination subscriber is currently registered. If this is an initial registration with the network, Terminal-B has no S-CSCF. In this case, the HSS returns selection criteria to the I-CSCF, and the I-CSCF selects a suitable S-CSCF for the user from a plurality of available S-CSCFs in the terminating home network. If the registration is a re-registration, the address of the terminating S-CSCF is returned to the terminating I-CSCF at step 42, where the information is cached. At step 43, the REGISTER message is forwarded to the terminating S-CSCF 24. At step 44, the terminating S-CSCF queries the terminating HSS for User-B's profile information to determine what telephony features the terminating user has subscribed to or activated. At step 45, the terminating HSS returns the profile information to the terminating S-CSCF where the information is cached.

Thereafter, Terminal-A 11 initiates call setup to Terminal-B by sending a SIP INVITE message 46 to the originating P-CSCF 13. SIP enabled multimedia communications include, but are not limited to, voice, video, instant messaging, presence, and a number of other data communications. At step 47, the INVITE message is forwarded to the originating I-CSCF 15 associated with the home network for the originating subscriber, and at 48, the SIP INVITE message is forwarded to the previously identified S-CSCF 18.

The originating S-CSCF 18 provides service invocation and other user features available to Terminal-A 11. Upon verifying that this particular user is able to initiate this particular call connection, the originating S-CSCF then transmits the SIP INVITE message at step 49 to the terminating I-CSCF 22 associated with the home network 21 of the terminating subscriber. At 51, the INVITE message is then forwarded to the terminating S-CSCF. At 52, the terminating S-CSCF determines from the terminating user's profile, the P-CSCF 26 currently serving the terminating Terminal-B 12. At 53, the INVITE message is forwarded to the terminating P-CSCF which then forwards it to Terminal-B at step 54.

Terminal-B 12 responds with a SIP 200 OK message at 55. The terminating P-CSCF 26 forwards the 200 OK message to the S-CSCF 24 in Terminal-B's home network at 56, and the terminating S-CSCF sends the 200 OK message to the terminating I-CSCF 22 at 57. At 58, the terminating I-CSCF 22 sends the 200 OK message to the originating S-CSCF 18 in Terminal-A's home network 14. The originating S-CSCF 18 forwards the 200 OK message at 59 to the originating I-CSCF 15, and at 61, the originating I-CSCF 15 sends the 200 OK message to the originating P-CSCF 13. Finally, at 62, the originating P-CSCF 13 sends the 200 OK message to Terminal-A 11.

At step 63, Terminal-A responds by sending an Acknowledgment to the originating P-CSCF 13 which forwards the Acknowledgment at step 64 to the originating I-CSCF 15. At 65, the originating I-CSCF sends the Acknowledgment to the originating S-CSCF which forwards it at step 66 to the terminating I-CSCF 22 in Terminal-B's home network 21. The terminating I-CSCF sends the Acknowledgment to the terminating S-CSCF 24 at step 67, which forwards it to the terminating P-CSCF 26 at step 68. Finally, at step 69, the terminating P-CSCF forwards the Acknowledgment to Terminal-B 12.

Once the destination terminal has been identified and acknowledged, an RTP data channel 70 may be established between Terminal-A 11 and Terminal-B 12. Media is then routed via MGCF-1 28 and MGCF-2 29 in the existing IP network 27, and no further participation is required by the 3GPP network until the call is completed and the session is torn down. At that time, the duration of the call is reported to an accounting server (not shown) which determines the charge for the call based on the call duration and the billing rate in effect at the time of the call.

Figure 3:
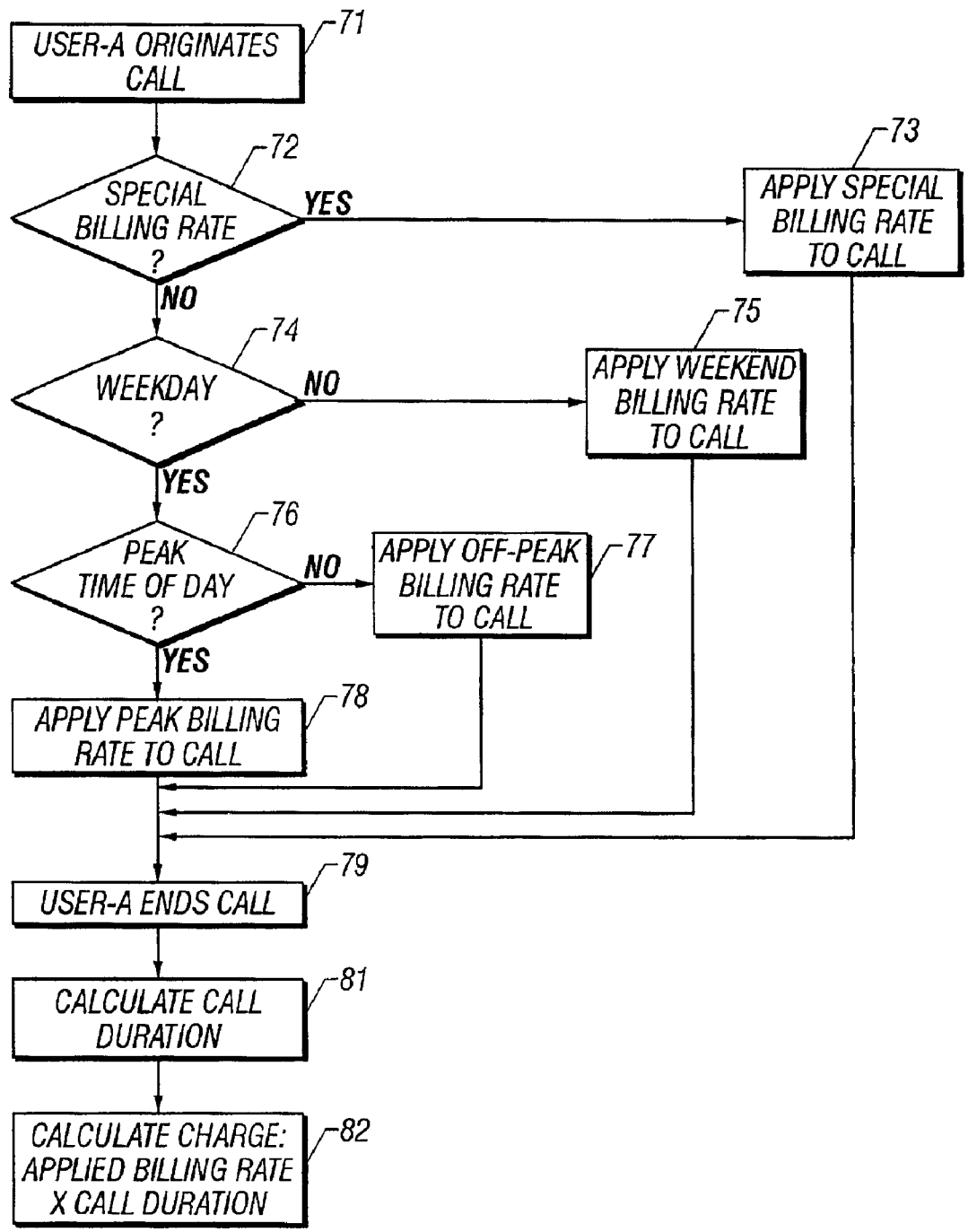
FIG. 3 (Prior Art) is a flow chart illustrating the steps of the existing method of calculating a charge for a call in a telecommunications network.

FIG. 3 is a flow chart illustrating the steps of the existing method of calculating a charge for a call in a telecommunications network. At step 71, a user such as User-A originates a call. Certain users may have subscriptions that provide them with special billing rates. This information is stored in the user profile in the HSS, and is downloaded to the user's S-CSCF during the registration process. At step 72, it is determined whether or not User-A is entitled to a special billing rate. If the profile indicates that User-A is entitled to a special billing rate, the process moves to step 73 where the special billing rate is applied to the call.

However, if User-A is not entitled to a special billing rate, the process moves from step 72 to step 74 where it is determined whether or not the call originated by User-A is originated on a weekday. If the call is not originated on a weekday, the process moves to step 75 where a weekend billing rate is applied to the call. However, if the call is originated on a weekday, the process moves from step 74 to step 76 where it is determined whether or not the call originated by User-A is originated during the peak time period of the day. If the call is not originated during the peak time period, the process moves to step 77 where an off-peak billing rate is applied to the call. However, if the call is originated during the peak time period, the process moves from step 76 to step 78 where the peak billing rate is applied to the call.

At step 79, User-A ends the call, and the call duration is calculated at step 81. Thereafter, the data may be sent to an accounting server or other billing node to calculate the charge for the call which is the applied billing rate multiplied by the call duration.

As is readily apparent, the traditional method of adjusting the billing rate that is charged to users in a telecommunications network relies on a gross estimate of the traffic load on the network based on historical averages of traffic loads at different times of the day and week. At any particular time, the actual traffic load may be lower or higher than the historical averages, and thus, the user may be charged at a rate that is either too high or too low for the actual network conditions. The present invention provides a system and method of billing a user of telecommunication services based on the actual reported traffic load in the network at the time the user places a call.

Figure 4:
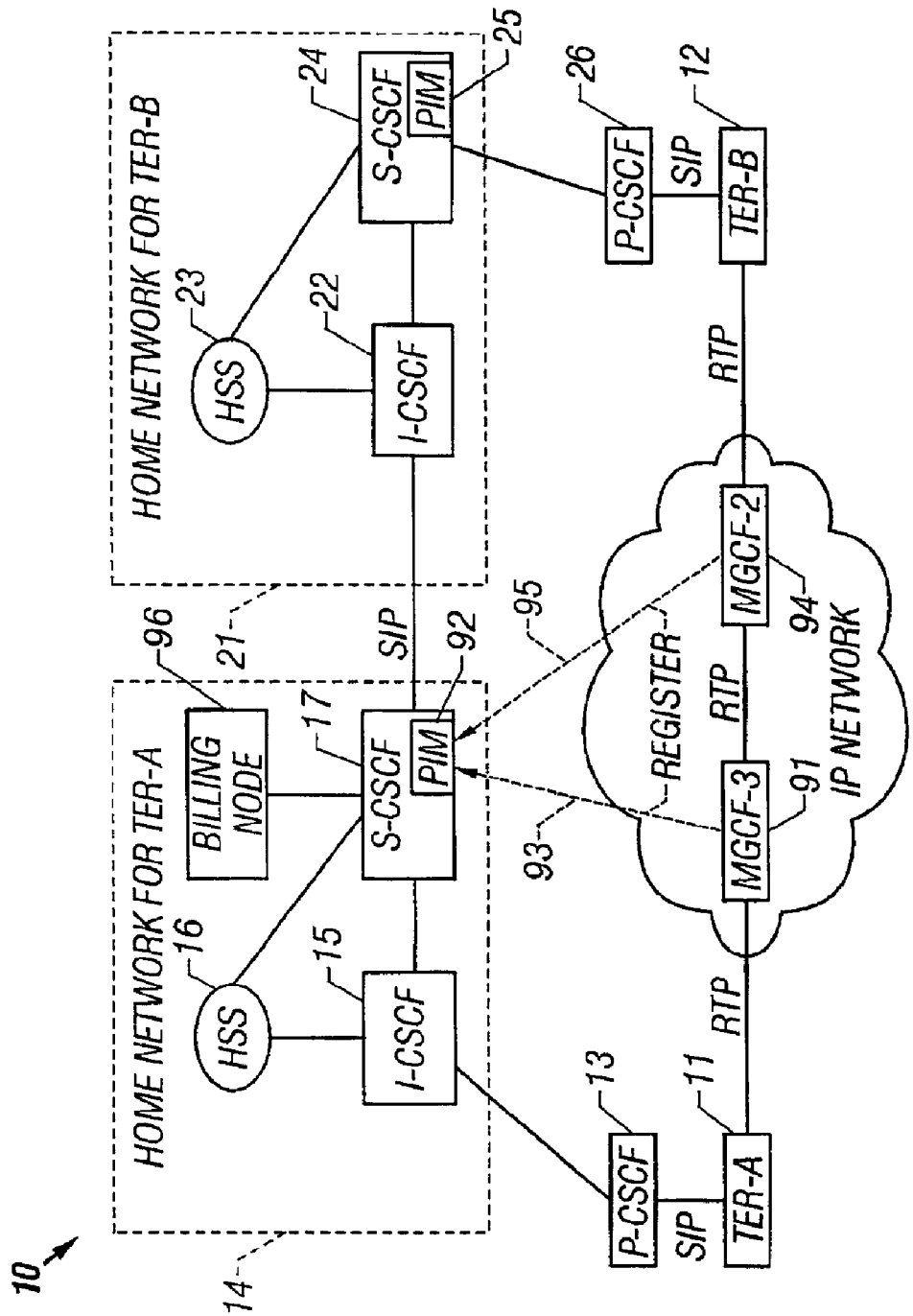
FIG. 4 is a simplified block diagram of a portion of a 3GPP network architecture modified in accordance with the teachings of the present invention.

FIG. 4 is a simplified block diagram of a portion of a 3GPP network architecture modified in accordance with the teachings of the present invention. The present invention provides a method for nodes in the IP Network 27 to generically register themselves with the 3GPP network as having specified service types, and having certain capabilities associated with the types of services that they offer. In the exemplary embodiment illustrated, MGCF-3 91 which controls access to the IP Network for Terminal-A 11 is modified to register with a modified PIM Server 92 in the S-CSCF 17. The REGISTER message 93 is modified in the present invention to include the service capabilities of the registering MGCF-3 and the current traffic load of the MGCF-3. The MGCF-3 sends a new REGISTER message whenever the traffic load changes by a threshold amount due to predefined triggering events. Likewise, the other MGCFs in the IP Network such as modified MGCF-4 94 also register with the PIM Server 92. MGCF-4 sends a new REGISTER message 95 whenever its traffic load changes by the threshold amount. Each MGCF may indicate the traffic load, for example, as a percentage of the MGCF's total bandwidth capacity. From this information, an overall network load level may be calculated.

The network operator then establishes a billing scheme based on the actual traffic load at the time of the call. Instead of having only two or three billing levels based on estimated average load levels during peak and off-peak times, the operator can establish a greater number of billing levels, or can use a sliding scale that adjusts with the actual traffic load. For example, when the network traffic load is 0–10%, calls may be billed at the network's lowest billing rate per minute. For each 10% that the traffic load increases, calls may be billed at progressively higher rates until the network traffic load reaches 91–100%, and calls may be billed at the network's highest rate per minute.

User-A who has registered with the network and the PIM server 92, may subscribe to a network-load based billing service. If so, the PIM Server sends real-time reports of traffic level to User-A's terminal. Terminals in the 3G network are equipped with a display, and the network traffic load may be continuously displayed in a range from 0–100%. With the network traffic load displayed on the terminal, User-A can assess the current billing rate before placing a call. During what was formerly known as peak time, the user may find that there are periods when the traffic load is lighter, and a call can actually be made at a lower rate. Alternatively, during off-peak hours, the user may find that there are periods when the traffic load is heavier, and any call that is made will be billed at a higher rate than would be otherwise expected. The user can then decide whether to proceed and make the call.

The body of the SIP REGISTER message may include descriptive xml or other code describing the MGCF's capabilities and current traffic load. This information is retained by the PIM Server for all registered service providers so that when a session is requested by a user, the PIM server can forward the request to a server with the correct capabilities. The service may be identified in a service tag at the end of the URI (e.g., service=conference or service=access node, etc.). Alternatively, the source address may identify the service in the form of servicename@domain.com.

The PIM Server 92 is modified to recognize the MGCFs as service providers, and to calculate a network traffic load from the traffic loads reported by the MGCFS. In addition, when users register and subscribe to the network-load based billing service, the PIM Server reports the network traffic load to the subscribing users. The PIM Server stores the presence state and the service capabilities of each registered user. The PIM Server may include a predefined list of service types that may register as users. Nodes providing those service types register as users with the PIM Server, but the PIM server classifies them as service providers. A number of users can be registered as providing a single service. Preferably, however, a parameter may be added to the REGISTER message at the end of the URI that says, for example, service=access node. With this notation, it is certain that the PIM server will recognize this registration as being a service. If the PIM server does not have that user configured because, for example, it is not capable of handling a particular type of service registration, an error message is returned. In addition, a greater number of services may be made available since the services would not be restricted to a particular predefined list.

When a subscribing user completes a call, the S-CSCF 17 determines the call duration. This information, along with the reported network traffic load is then sent to a Billing Node 96 using, for example, the Diameter protocol. The Billing Node then determines the applicable billing rate and calculates a final charge for the call.

Figure 5:
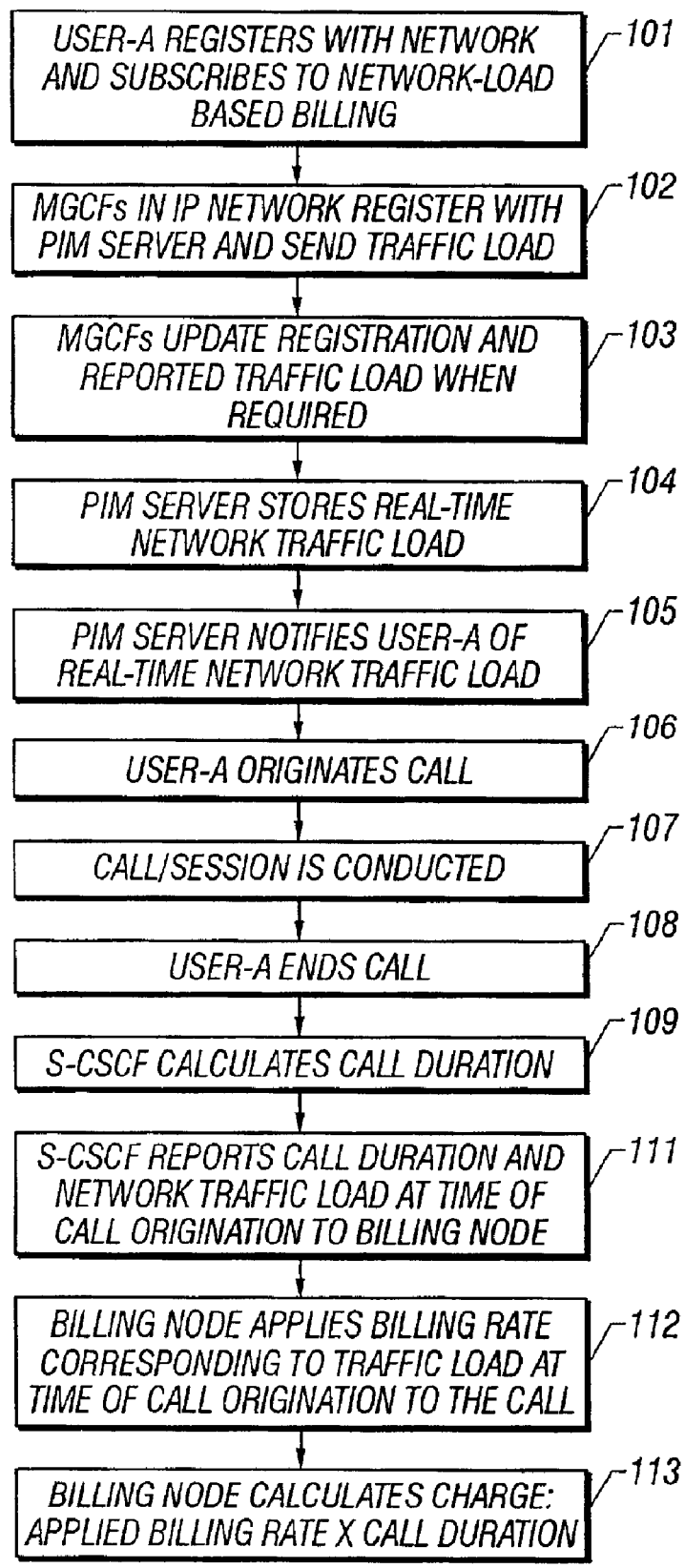
FIG. 5 is a flow chart illustrating an embodiment of the method of the present invention for determining a charge for a call in a telecommunications network.

FIG. 5 is a flow chart illustrating an embodiment of the method of the present invention for determining a charge for a call in a telecommunications network. At step 101, a user such as User-A registers with the network and the PIM Server 92, and subscribes to the network-load based billing service. Terminal-A sends a SUBSCRIBE message to the S-CSCF 17 and identifies the desired service as the network-load based billing service. When using the SIP protocol, the SUBSCRIBE message may be formatted as follows:

SUBSCRIBE userA@x.com SIP/2.0
From: "Me"<userA@x.com>;tag=4321
To: "Me"<userA@x.com>;service=loadbilling
. . .

At step 102, the MGCFs in the IP Network 27, such as MGCF-3 91 and MGCF-4 94, register with the PIM Server and include their traffic load levels in their registration messages. In the preferred embodiment, an extension is placed in the SIP REGISTER message that identifies the service(s) supported by the registering entity, in this case, an access node. The REGISTER message from an MGCF may be formatted as follows:

REGISTER blinky@x.com SIP/2.0
From: "Access Node" <blinky@x.com>;
service=accessnode;tag=1234
To: "Access Node"<blinky@x.com>
. . .
Content-Type: application/service+xml
<media=audio>
<media=video>

In this way, the PIM server does not have to maintain a predefined list of service usernames. Instead, the value of the "service=" parameter reflects the type of service offered. This greatly reduces the burden on the server because less special provisioning has to be done to accommodate service users.

At step 103, the MGCFs send update registration messages to the PIM Server whenever required by a change in their presence state or traffic load. At step 104, the PIM Server calculates and stores the network traffic load based on the traffic loads reported by the MGCFs. The PIM Server recognizes the MGCFs as service providers for the network-load based billing service. At step 105, the PIM Server sends the real-time network traffic load information to User-A who subscribes to the network-load based billing service. User-A can then determine the network traffic load level from his terminal prior to originating a call.

At step 106, User-A originates a call, and the call/session is conducted at step 107. At step 108, User-A ends the call, and at 109, the S-CSCF 17 determines the call duration. At step 111, the S-CSCF reports to the Billing Node 96, the call duration and the network traffic load level that was reported at the time that User-A originated the call. At step 112, the Billing Node determines the billing rate corresponding to the reported network traffic load and applies that billing rate to the call. At step 113, the Billing Node calculates the charge for the call by multiplying the applied billing rate by the call duration, as reported by the S-CSCF.

It is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, it should be clear to those skilled in the art that the present invention is not limited to providing a billing service that calculates the charge for a call based on the call duration. The invention is equally applicable to billing methodologies that utilize the volume of data transferred during the call/session as the basis for calculating the charge for the call. When the call duration is used, the billing rate is expressed as a cost per unit of time. When the volume of data transferred during the call is used, the billing rate is expressed as a cost per unit volume of data. In both scenarios, the present invention utilizes the reported network traffic load to determine a billing rate that is then applied to either the call duration or the volume of data transferred to calculate a charge for the call.

Additionally, whereas the use of a specific network architecture and specific messages and signaling protocols has been described in reference to the presently preferred exemplary embodiment of the present invention, such architectures and signaling implementations are merely illustrative. Accordingly, the scope of the present invention is defined solely by the claims set forth hereinbelow.

What is claimed is:

1. A method of billing a call made by a user in a telecommunications network based on a reported traffic load in the network, said method comprising the steps of:
    sending to a presence server in the network, a registration message from at least one Media Gateway Control Function (MGCF), said registration message including a traffic load for the MGCF wherein the network utilizes Session Initiation Protocol (SIP) control signaling for call setup and call control, and the step of sending said registration message includes:
        modifying a SIP REGISTER message to include said traffic load information for the MGCF; and
        sending the SIP REGISTER message from the MGCF to the presence server;
    determining a billing rate for the user based on the traffic load reported by the MGCF; and
    applying the determined billing rate to the call to calculate a charge for the call.

2. The method of billing a call of claim 1 further comprising the steps of:
    registering in the network, a user who subscribes to a network-load based billing service; and
    sending from the presence server to the user, an indication of the traffic load reported by the MGCF.

3. The method of billing a call of claim 1 wherein the step of sending a registration message from at least one MGCF to a presence server in the network also includes sending an update SIP REGISTER message from the MGCF to the presence server whenever the presence state of the MGCF changes or the traffic load changes by a threshold amount.

4. The method of billing a call of claim 3 further comprising the steps of:
    registering in the network, a user who subscribes to a network-load based billing service; and
    notifying the user of changes to the network traffic load whenever the MGCF sends an update SIP REGISTER message to the presence server.

5. The method of billing a call of claim 4 wherein the step of notifying the user of changes to the network traffic load includes notifying the user of changes to the network traffic load prior to the user placing the call, thereby enabling the user to assess the corresponding billing rate prior to placing the call.

6. A method of billing a call made by a user in a telecommunications network bused on a reported traffic load in the network, said method comprising the steps of:
    sending to a presence server in the network, a registration message from at least one Media Gateway Control Function (MGCF), said registration message including a traffic load for the MGCF;
    determining a billing rate for the user based on the traffic load reported by the MGCF; and
    applying the determined billing rate to the call to calculate a charge for the call, said step further comprises the steps of:
        calculating a charge for the call based on the determined billing rate and parameters of the call relating to network resource usage;
        determining a duration of the call; and
        multiplying the duration of the call by the determined billing rate wherein the billing rate is expressed as a cost per unit time.

7. The method of billing a call of claim 6 wherein the billing rate is expressed as a cost per unit volume of data transferred, and the step of calculating a charge for the call based on the determined billing rate and parameters of the call relating to network resource usage includes:
    determining a volume of data transferred during the call; and
    multiplying the volume of data transferred during the call by the determined billing rate.

8. A method of billing a call made by a user in a telecommunications network based on a reported traffic load in the network, said method comprising the steps of:
    sending to a presence server in the network, a registration message from at least one Media Gateway Control Function (MGCF), said registration message including a traffic load for the MGCF;
    sending an update of the traffic load from the MGCF to the presence server whenever the traffic load of the MGCF changes by a threshold amount;
    registering in the network, a user who subscribes to a network-load based billing service;
    sending from the presence server to the user, an indication of the current traffic load reported by the MGCF;
    sending the reported traffic load from the presence server to a billing node when the user places the call;
    determining by the billing node, a billing rate for the user based on the traffic load reported by the presence server; determining by a Call State Control Function (CSCF), parameters of the call relating to network resource usage;
    sending the parameters from the CSCF to the billing node; and
    calculating by the billing node, a charge for the call based on the determined billing rate and the parameters relating to network resource usage.

9. The method of billing a call of claim 8 wherein the step of determining parameters of the call relating to network resource usage includes determining a duration of the call.

10. The method of billing a call of claim 8 wherein the step of determining parameters of the call relating to network resource usage includes determining a volume of data transferred during the call.

11. A system in a telecommunications network for billing a call placed by a user based on a reported traffic load in the network, said system comprising:

at least one Media Gateway Control Function (MGCF) that sends registration information to the network, said registration information including a reported traffic load for the MGCF;

a presence and instant messaging (PIM) server that receives the registration information from the MGCF and sends the reported traffic load to a billing node;

a Call State Control Function (CSCF) that determines parameters of the call relating to network resource usage and sends the parameters to the billing node; and a billing node that determines a billing rate based on the reported traffic load and calculates a charge for the call based on the determined billing rate and the parameters relating to network resource usage.

12. The system for billing a call of claim 11 wherein the CSCF includes means for determining a duration of the call, and the billing node determines a billing rate expressed as a cost per unit time and calculates a charge for the call by multiplying the duration of the call by the determined billing rate.

13. The system for billing a call of claim 11 wherein the CSCF includes means for determining a volume of data transferred during tho call, and the billing node determines a billing rate expressed as a cost per unit volume of data and calculates a charge for the call by multiplying the volume of data transferred during the call by the determined billing rate.

14. A system in a telecommunications network for billing a call placed by a user based on a reported traffic load in the network, said system comprising:

means for controlling data transferred through the network, said data controlling means including means for sending registration information to the network, said registration information including a reported traffic load for the network;

means for receiving the registration information from the data controlling means and sending the reported traffic load to a billing means;

means for setting up and controlling the call, said call setup and control means including means for determining parameters of the call relating to network resource usage and sending the parameters to the billing means; and billing means for determining a billing rate based on the reported traffic load and calculating a charge for the call based on the determined billing rate and the parameters relating to network resource usage.

* * * * *

UNITED STATES PATENT AND TRADEMARK OFFICE
CERTIFICATE OF CORRECTION

PATENT NO.        : 6,947,724 B2
APPLICATION NO. : 10/038934
DATED             : September 20, 2005
INVENTOR(S)       : Adam Chaney It is certified that error appears in the above-identified patent and that said Letters Patent is hereby corrected as shown below:

In Column 3, Lines 64, after "associated" delete "is".

In Column 7, Line 48, delete "MGCFS" and insert -- MGCFs --, therefor.

In Column 10, Line 5, in Claim 6, delete "bused" and insert -- based --, therefor.

In Column 11, Line 22, in Claim 13, delete "tho" and insert -- the --, therefor.

Signed and Sealed this

Twentieth Day of November, 2007

JON W. DUDAS
*Director of the United States Patent and Trademark Office*